(12) United States Patent
Gutierrez et al.

(10) Patent No.: US 9,019,390 B2
(45) Date of Patent: Apr. 28, 2015

(54) OPTICAL IMAGE STABILIZATION USING TANGENTIALLY ACTUATED MEMS DEVICES

(75) Inventors: Roman C. Gutierrez, Arcadia, CA (US); Robert J. Calvet, Pasadena, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 643 days.

(21) Appl. No.: 13/247,895

(22) Filed: Sep. 28, 2011

(65) Prior Publication Data

US 2013/0076919 A1 Mar. 28, 2013

(51) Int. Cl.
| | |
|---|---|
| H04N 5/228 | (2006.01) |
| H04N 5/232 | (2006.01) |
| G02B 27/64 | (2006.01) |
| G03B 3/10 | (2006.01) |

(52) U.S. Cl.
CPC .......... *H04N 5/23251* (2013.01); *G02B 27/646* (2013.01); *G03B 3/10* (2013.01); *G03B 2205/0046* (2013.01); *G03B 2205/0053* (2013.01); *H04N 5/2328* (2013.01)

(58) Field of Classification Search
USPC ..................... 310/309; 428/50; 257/415, 417; 73/514.18, 514.32; 348/208.99, 208.2, 348/208.1, 345, 207.99
See application file for complete search history.

(56) References Cited

U.S. PATENT DOCUMENTS

| | | |
|---|---|---|
| 2,774,001 A | 12/1956 | Riedel |
| 4,333,722 A | 6/1982 | Lee |
| 4,384,778 A | 5/1983 | Lee et al. |
| 4,408,857 A | 10/1983 | Frank |
| 4,496,217 A | 1/1985 | Aoyagi |
| 4,716,432 A | 12/1987 | Stephany |
| 4,860,040 A | 8/1989 | Tamamura et al. |
| 5,150,260 A | 9/1992 | Chigira |
| 5,386,294 A | 1/1995 | Ototake et al. |
| 5,699,621 A | 12/1997 | Trumper et al. |
| 5,825,560 A | 10/1998 | Ogura et al. |
| 5,867,302 A | 2/1999 | Fleming |
| 5,986,826 A | 11/1999 | Kosaka et al. |
| 5,995,688 A | 11/1999 | Aksyuk et al. |
| 6,033,131 A | 3/2000 | Ghosh |

(Continued)

FOREIGN PATENT DOCUMENTS

| | | |
|---|---|---|
| EP | 1855145 | 11/2007 |
| EP | 1959284 | 8/2008 |

(Continued)

OTHER PUBLICATIONS

Takahashi, K., et al.; "Switched-Layer Design for SOI Bulk Micromachined XYZ Stage Using Stiction Bar for Interlayer Electrical Connection," Journal of Microelectromechanical Systems, IEEE Service Center, US, vol. 18, No. 4, pp. 818-827, Aug. 1, 2009.

(Continued)

*Primary Examiner* — Mekonnen Dagnew
(74) *Attorney, Agent, or Firm* — Haynes and Boone LLP

(57) ABSTRACT

In one example, an actuator device useful in, e.g., a camera for, e.g., optical image stabilization (OIS), includes a stage resiliently supported for movement within a plane, three or more actuators, each coupled to an outer periphery of the stage and operable to apply a force acting in the plane and tangentially to the stage when actuated, and an outer frame surrounding and supporting the stage and the actuators.

20 Claims, 10 Drawing Sheets

(56) References Cited

U.S. PATENT DOCUMENTS

| | | | |
|---|---|---|---|
| 6,068,801 A | 5/2000 | Bodo et al. |
| 6,205,267 B1 | 3/2001 | Aksyuk et al. |
| 6,239,473 B1 | 5/2001 | Adams |
| 6,262,827 B1 | 7/2001 | Ueda et al. |
| 6,291,875 B1 | 9/2001 | Clark |
| 6,392,703 B1 | 5/2002 | Uchino et al. |
| 6,426,777 B1 | 7/2002 | Sato |
| 6,497,141 B1 | 12/2002 | Turner et al. |
| 6,535,311 B1 | 3/2003 | Lindquist |
| 6,675,671 B1 | 1/2004 | Jokiel et al. |
| 6,679,055 B1 | 1/2004 | Ellis |
| 6,806,991 B1 | 10/2004 | Sarkar |
| 6,847,907 B1 | 1/2005 | Novotny |
| 6,850,675 B1 | 2/2005 | Calvet et al. |
| 6,914,635 B2 | 7/2005 | Ostergard |
| 6,950,570 B1 | 9/2005 | Novotny |
| 6,958,777 B1 | 10/2005 | Pine |
| 7,027,206 B2 | 4/2006 | Mochizuki |
| 7,038,150 B1 | 5/2006 | Polosky et al. |
| 7,113,688 B2 | 9/2006 | Calvet et al. |
| 7,148,603 B1 | 12/2006 | Garcia |
| 7,154,199 B2 | 12/2006 | Yasuda |
| 7,190,854 B1 | 3/2007 | Novotny |
| 7,266,272 B1 | 9/2007 | Calvet et al. |
| 7,285,879 B2 | 10/2007 | Osaka |
| 7,359,131 B1 | 4/2008 | Gutierrez et al. |
| 7,372,074 B2 | 5/2008 | Milne et al. |
| 7,436,207 B2 | 10/2008 | Rogers et al. |
| 7,477,842 B2 | 1/2009 | Gutierrez |
| 7,545,591 B1 | 6/2009 | Tong et al. |
| 7,555,210 B2 | 6/2009 | Calvet |
| 7,557,470 B2 | 7/2009 | Culpepper et al. |
| 7,579,848 B2 | 8/2009 | Bottoms et al. |
| 7,586,702 B1 | 9/2009 | Huang et al. |
| 7,645,627 B2 | 1/2010 | Christenson |
| 7,646,969 B2 | 1/2010 | Calvet et al. |
| 7,705,909 B2 | 4/2010 | Ishizawa et al. |
| 7,720,366 B2 | 5/2010 | Iwasaki et al. |
| 7,838,322 B1 | 11/2010 | Vargo |
| 7,855,489 B2 | 12/2010 | Hirano |
| 7,872,394 B2 | 1/2011 | Gritters et al. |
| 7,990,628 B1 | 8/2011 | Calvet et al. |
| 8,004,780 B2 | 8/2011 | Gutierrez et al. |
| 8,178,936 B2 | 5/2012 | Zhe et al. |
| 8,299,598 B2 | 10/2012 | Moden |
| 2001/0004420 A1 | 6/2001 | Kuwana et al. |
| 2002/0006687 A1 | 1/2002 | Lam |
| 2002/0070634 A1 | 6/2002 | Tai et al. |
| 2002/0105699 A1 | 8/2002 | Miracky et al. |
| 2002/0125789 A1 | 9/2002 | Brandt |
| 2002/0130586 A1 | 9/2002 | Mao |
| 2003/0026547 A1 | 2/2003 | Trzecieski |
| 2003/0048036 A1 | 3/2003 | Lemkin |
| 2003/0062422 A1 | 4/2003 | Fateley et al. |
| 2003/0063838 A1 | 4/2003 | Hagood |
| 2003/0076421 A1 | 4/2003 | Dutta |
| 2003/0086751 A1 | 5/2003 | Culpepper |
| 2003/0210116 A1 | 11/2003 | Lane et al. |
| 2004/0017620 A1 | 1/2004 | Kaneko et al. |
| 2004/0048410 A1 | 3/2004 | O'Brien et al. |
| 2004/0066494 A1 | 4/2004 | Lee et al. |
| 2004/0136680 A1 | 7/2004 | Medina |
| 2004/0149035 A1* | 8/2004 | Acar et al. ............... 73/504.12 |
| 2004/0183936 A1 | 9/2004 | Kim et al. |
| 2004/0184132 A1 | 9/2004 | Novotny |
| 2004/0189969 A1 | 9/2004 | Mizuno |
| 2004/0201773 A1 | 10/2004 | Ostergard |
| 2005/0000311 A1 | 1/2005 | Storm |
| 2005/0002008 A1 | 1/2005 | De Weerdt et al. |
| 2005/0002086 A1 | 1/2005 | Starkweather et al. |
| 2005/0007489 A1 | 1/2005 | Ahn et al. |
| 2005/0095813 A1 | 5/2005 | Zhu et al. |
| 2005/0139542 A1 | 6/2005 | Dickensheets et al. |
| 2005/0148433 A1 | 7/2005 | Wang et al. |
| 2005/0156481 A1* | 7/2005 | Zhou et al. .................. 310/309 |
| 2005/0219399 A1 | 10/2005 | Sato et al. |
| 2005/0249487 A1 | 11/2005 | Gutierrez |
| 2006/0028320 A1 | 2/2006 | Osaka |
| 2006/0033938 A1 | 2/2006 | Kopf et al. |
| 2006/0056084 A1 | 3/2006 | Araki |
| 2006/0092514 A1 | 5/2006 | Koo |
| 2006/0153556 A1 | 7/2006 | Lee et al. |
| 2006/0183332 A1 | 8/2006 | Kang |
| 2006/0192858 A1 | 8/2006 | Calvet |
| 2006/0193618 A1 | 8/2006 | Calvet |
| 2006/0204242 A1 | 9/2006 | Gutierrez et al. |
| 2006/0209012 A1 | 9/2006 | Hagood |
| 2006/0219006 A1 | 10/2006 | Nasiri et al. |
| 2006/0250325 A1 | 11/2006 | Hagood et al. |
| 2006/0252297 A1 | 11/2006 | Culpepper |
| 2006/0277997 A1 | 12/2006 | Foster |
| 2007/0024155 A1 | 2/2007 | Calvet |
| 2007/0133976 A1 | 6/2007 | Gutierrez |
| 2008/0020573 A1 | 1/2008 | Birkmeyer et al. |
| 2008/0031609 A1* | 2/2008 | Rukes ............................ 396/89 |
| 2008/0044172 A1 | 2/2008 | Tang et al. |
| 2008/0054757 A1 | 3/2008 | Aksyuk |
| 2008/0198249 A1 | 8/2008 | Tanimura et al. |
| 2008/0240704 A1 | 10/2008 | Takahashi |
| 2008/0279498 A1 | 11/2008 | Sampsell et al. |
| 2008/0309191 A1 | 12/2008 | Chou |
| 2009/0031548 A1 | 2/2009 | Zaitsu |
| 2009/0185796 A1 | 7/2009 | Tsutsumi et al. |
| 2009/0213236 A1 | 8/2009 | Chiou |
| 2009/0244302 A1 | 10/2009 | Tsai |
| 2009/0244668 A1 | 10/2009 | Fujino |
| 2009/0284816 A1 | 11/2009 | Davis |
| 2009/0310959 A1 | 12/2009 | Shih et al. |
| 2010/0232777 A1 | 9/2010 | Tseng et al. |
| 2010/0284081 A1 | 11/2010 | Gutierrez |
| 2011/0026148 A1 | 2/2011 | Tanimura et al. |

FOREIGN PATENT DOCUMENTS

| | | |
|---|---|---|
| EP | 2264507 | 12/2010 |
| JP | 2006-297543 | 11/2006 |
| JP | 2008-010624 | 1/2008 |
| JP | 2010-145264 | 7/2010 |
| JP | 2010-167536 | 8/2010 |
| KR | 2008/0079115 | 8/2008 |
| WO | WO 02/063371 | 8/2002 |
| WO | WO 2008/061025 | 5/2008 |
| WO | WO 2010/038229 | 4/2010 |

OTHER PUBLICATIONS

PCT/US 06/07024 Search Report of Nov. 28, 2007.

Akihiro Koga et al. "Electrostatic Linear Microactuator Mechanism for Focusing a CCD Camera"; Journal of Lightwave Technology, vol. 17, No. 1: p. 43-47; Jan. 1999.

Tsuboi, O, et al., "A Rotational Comb-Driven Micromirror with a Large Deflection Angle and Low Drive Voltage," Technical Digest. MEMS. IEEE International Conference on Microelectro Mechanical Systems, Jan. 20, 2002, pp. 532-535.

Yi, Chu, et al., "Design, Fabrication and Control of Components in MEMS-Based Optical Pickups," IEEE Transactions on Magnetics, IEEE Service Center, New York, US, vol. 17, No, 2, Feb. 1, 2007, pp. 780-784.

Minching, Wu, et al., "Development of Tracking and Focusing Micro Actuators for Dual-Stage Optical Pick-Up Head," Journal of Optics. A, Pure and Applied Optics, Institute of Physics Publishing, Bristol, GB, vol. 8, No. 7, Jul. 1, 2006, pp. S323-S329.

Seong-Hyok Kim, et al., Integrated Micro Optical Flying Head with Lens Positioning Actuator for Small Form Factor Data Storage, Transducers '03. 12th International Conference on Solid-State Sensors, Actuators and Microsystems. Digest of Technical Papers (Cat. No. 03TH8664), vol. 1, Jan. 1, 2003, pp. 607-610.

Sunghoon, Kwon, et al., "Large Displacement Vertical Microlens Scanner wit Low Driving Voltage," IEEE Photonics Technology Letters, IEEE Service Center, Piscataway, NJ, US, vol. 14, No. 11, Nov. 1, 2002.

* cited by examiner

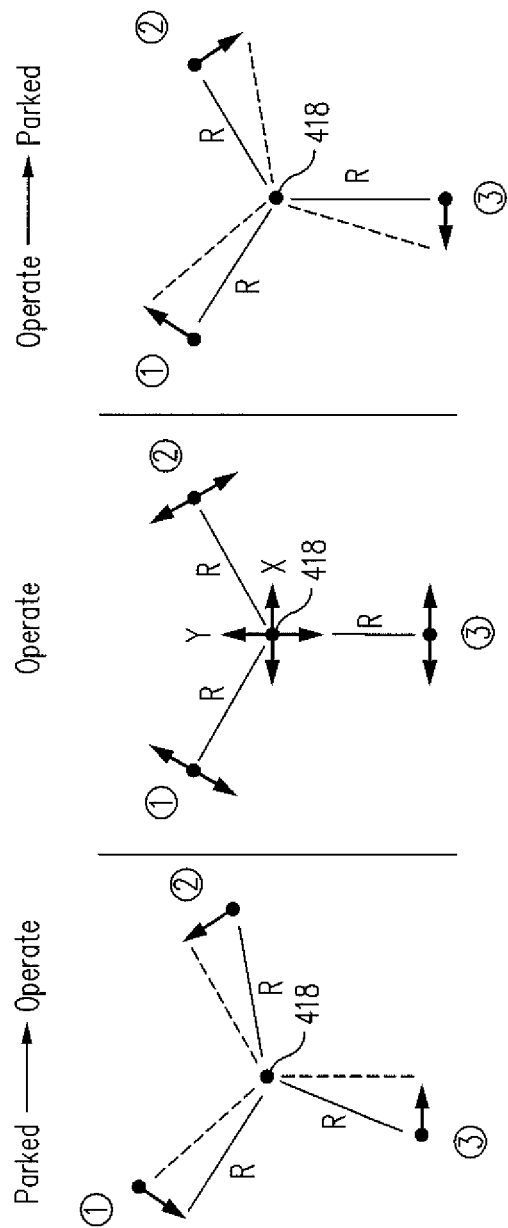

OPTICAL IMAGE STABILIZATION USING TANGENTIALLY ACTUATED MEMS DEVICES

BACKGROUND

1. Technical Field

This disclosure relates, in general, to optical devices and mechanisms, and more particularly, to actuators that are useful in, for example, cameras, particularly miniature cameras and the like, to effect relative movement of optical elements, such as lenses, image sensors and the like, to achieve desirable optical effects, such as, for example, optical image stabilization (OIS).

2. Related Art

Actuators for use in miniature cameras and other optical devices are well known. Such actuators typically comprise voice coils or Lorentz actuators that are used, for example, to move a lens for focusing, zooming, or OIS.

Miniature cameras are frequently used in a variety of different electronic devices. For example, miniature cameras are commonly incorporated in cellular telephones, laptop computers, and surveillance systems. Miniature cameras can also be used to advantage in many other applications, such as colonoscopy, arthroscopy and the like.

As the size and cost of electronic devices continue to shrink, it becomes necessary to achieve a concomitant reduction in the size and cost of the miniature camera components incorporated into such devices. In the past, this reduction in size and cost has meant that certain advanced features, such as focus, including autofocus, zoom and OIS capabilities typically found in larger, more advanced, and hence, more expensive cameras, must be omitted or provided in an attenuated form. The reason for this is due in large part to the larger size, complexity and cost of the actuators needed to effect relative movement of optical elements, such as lenses, image sensors and the like, in order to achieve such advanced effects.

Accordingly, a need exists for actuator devices for optical elements that are substantially smaller, simpler and less expensive than the prior art mechanisms, and yet which can be reliably implemented in miniature camera systems to achieve the same or even improved advanced features of higher-end camera systems, such as OIS.

SUMMARY

In accordance with the present disclosure, actuator devices for optical elements are provided which are substantially smaller and simpler than prior art actuator mechanisms, and which can be reliably implemented in miniature camera systems to achieve, among others, the same advanced features of higher-end camera systems, and in particular, OIS.

In one example embodiment, an actuator device comprises a stage resiliently supported for movement within a plane, three or more actuators, each coupled to an outer periphery of the stage and operable to apply a force acting in the plane and tangentially to the stage when actuated, and an outer frame surrounding and supporting the stage and the actuators.

In another example embodiment, a camera comprises a sensor having an image sensing surface and an actuator device, including a stage resiliently supported for movement within a plane, three or more actuators, each coupled to an outer periphery of the stage and operable to apply a force acting in the plane and tangentially to the stage when actuated, and an outer frame surrounding and supporting the stage and the actuators. An optical element, such as a lens, is disposed on the stage of the actuator device to move conjointly therewith and is operable to focus an image of a subject on the image sensing surface of the sensor. In an OIS embodiment of the camera, a sensing apparatus can be included for sensing at least one of vertical and/or horizontal accelerations of the camera and for outputting signals respectively corresponding thereto, and a controlling apparatus can be included for selectably controlling the actuators of the actuator device using the signals output from the sensing apparatus such that the image of the subject formed by the optical element on the sensing surface of the sensor remains stable during the accelerations of the camera.

In another example embodiment, a camera comprises an actuator device, including a stage resiliently supported for movement within a plane, three or more actuators, each coupled to an outer periphery of the stage and operable to apply a force acting in the plane and tangentially to the stage when actuated, and an outer frame surrounding and supporting the stage and the actuators. A sensor is disposed on the stage of the actuator device to move conjointly therewith and is operable to sense an image of a subject focused on an image sensing surface thereof. An optical element is disposed in front of the stage of the actuator device and operable to focus an image of a subject on the image sensing surface of the sensor. In an OIS embodiment thereof, a sensing apparatus can be provided for sensing at least one of vertical and/or horizontal accelerations of the camera and for outputting signals respectively corresponding thereto, and a controlling apparatus can be provided for selectably controlling the actuators of the actuator device using the signals output from the sensing apparatus such that the image of the subject formed by the optical element on the sensing surface of the sensor remains stable during the accelerations of the camera.

In yet another example, a method comprises providing a stage resiliently supported for movement within a plane, coupling three or more actuators to an outer periphery of the stage, each of the actuators being operable to apply a force acting within the plane and tangentially to the stage when actuated, and selectably actuating each of the actuators such that the stage moves in the plane with at least one of pure translational and/or pure rotational movement therein.

A better understanding of the above and many other features and advantages of the novel actuator devices of the present disclosure and the several methods of their use can be obtained from a consideration of the detailed description of some example embodiments thereof below, particularly if such consideration is made in conjunction with the figures of the appended drawings, wherein like reference numerals are used to identify like elements illustrated in one or more of the figures.

BRIEF DESCRIPTION OF THE FIGURES OF THE DRAWINGS

FIG. 6A is an enlarged detail view taken from the actuator device of FIG. 6, showing one of a pair of flexures coupling a moving frame of an actuator of the device to a stage of the device;

FIG. 6B is an enlarged detail view taken from the actuator device of FIG. 6, showing a limit stop useful for preventing large relative motion between the actuators and the stage of the actuator device during shock;

FIGS. 9A-9C are vector diagrams illustrating in-plane rotational movement of a stage of the actuator device of FIG. 6 between a "parked" state and an "operating" state;

DETAILED DESCRIPTION

In accordance with the present disclosure, actuator devices for optical elements are provided which are substantially smaller, simpler and less expensive than prior art actuator mechanisms, and which can be reliably implemented in miniature camera systems to achieve, among others, the same advanced features of higher-end camera systems, and in particular, OIS features.

Figure 1:
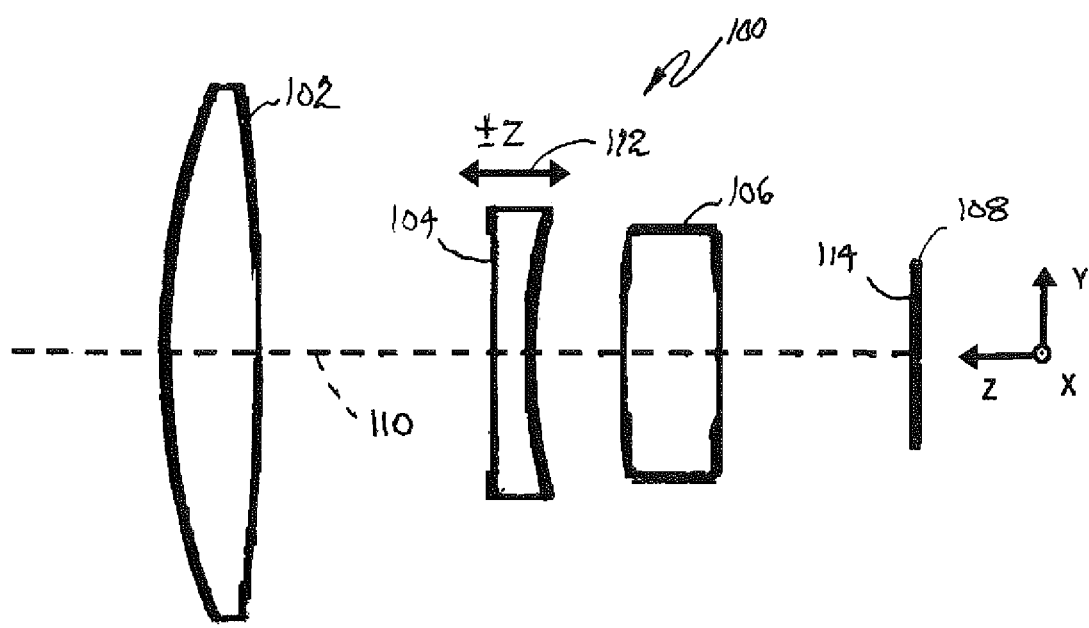
FIG. 1 is a schematic representation of an example digital camera, showing an intermediate lens movable along an optical axis of the camera to effect focusing and/or zooming effects.

An example of a miniature digital camera 100 of a type currently found in many stand-alone cameras, cell phones, PDAs, laptop computers, surveillance systems and the like is illustrated in the schematic side elevation view of FIG. 1. The example camera 100 illustrated includes a front-end lens 102, a moveable intermediate lens 104, a back-end lens 106, and a digital imaging sensor 108, such as a CMOS or CCD imaging sensor "chip" or integrated circuit (IC) of a known type, all disposed coaxially with respect to each other along an optical axis 110 of the camera 100. As those of some skill in the art will appreciate, in the embodiment illustrated, movement of the moveable lens 104 along the optical, or Z axis 110 in the direction of the double-headed arrow 112 by a suitable actuator device can effect focusing and/or zooming of an image formed on an "active," or image forming surface 114, of the imaging sensor 108.

Figure 2:
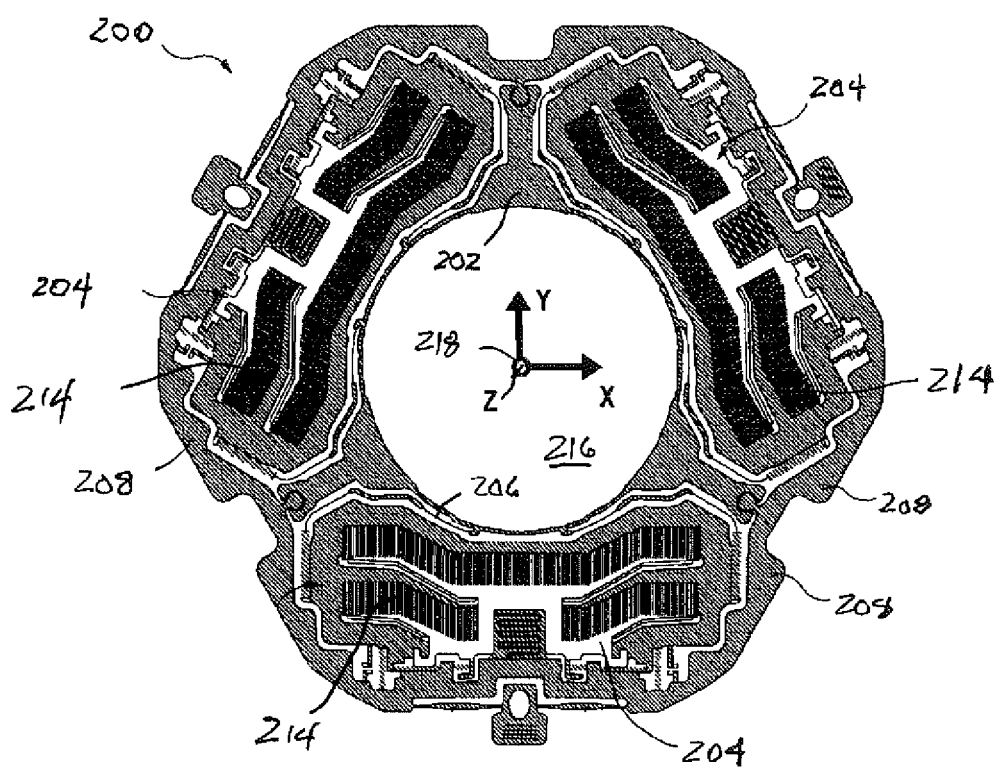
FIG. 2 is a front end view of an example actuator device useful in the example camera of FIG. 1 to effect movement of the moving lens along the optical axis of the camera.

A small, inexpensive and lightweight actuator device 200 useful for effecting such ±Z movement of the lens 104 along the optical or Z axis 110 of the camera 100 is illustrated in FIG. 2 and described in detail in commonly owned U.S. patent application Ser. No. 12/946,515, filed Nov. 15, 2010, and a miniature lens barrel for a camera incorporating such an actuator device is described in detail in commonly owned U.S. patent application Ser. No. 12/946,680, also filed Nov. 15, 2010. The disclosures of these applications are both incorporated herein by reference.

As illustrated in FIG. 2 and discussed in the foregoing applications, the generally planar actuator device 200 comprises a moveable stage 202 resiliently supported for movement in the ±Z direction, i.e., into and out of the plane of the device 200, two or more actuators 204, each coupled to an outer periphery of the stage 202 by one or more solid, resilient hinges, or "flexures" 206, and operable to apply a respective rotational force in the ±Z direction to the stage 202 when actuated, and an outer frame 208 surrounding and supporting the stage 202 and the actuators 204 during operation. In the particular embodiment illustrated, three actuators 204 are provided, but in other possible embodiments, a fewer or a greater number of actuators 204 can be used.

Figure 3:
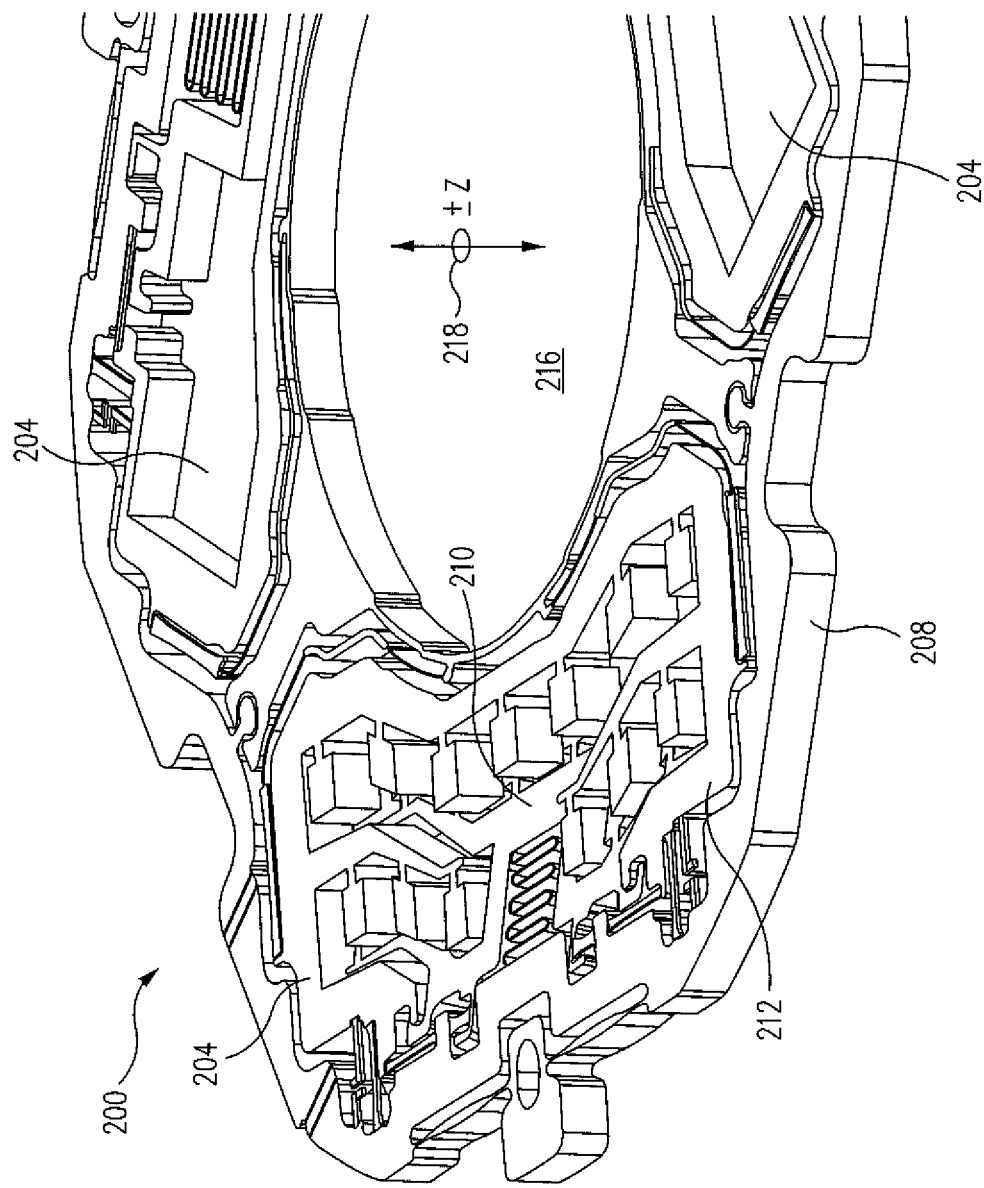
FIG. 3 is a partial perspective view of the actuator device of FIG. 2, showing the device deployed for operation.
Figure 4:
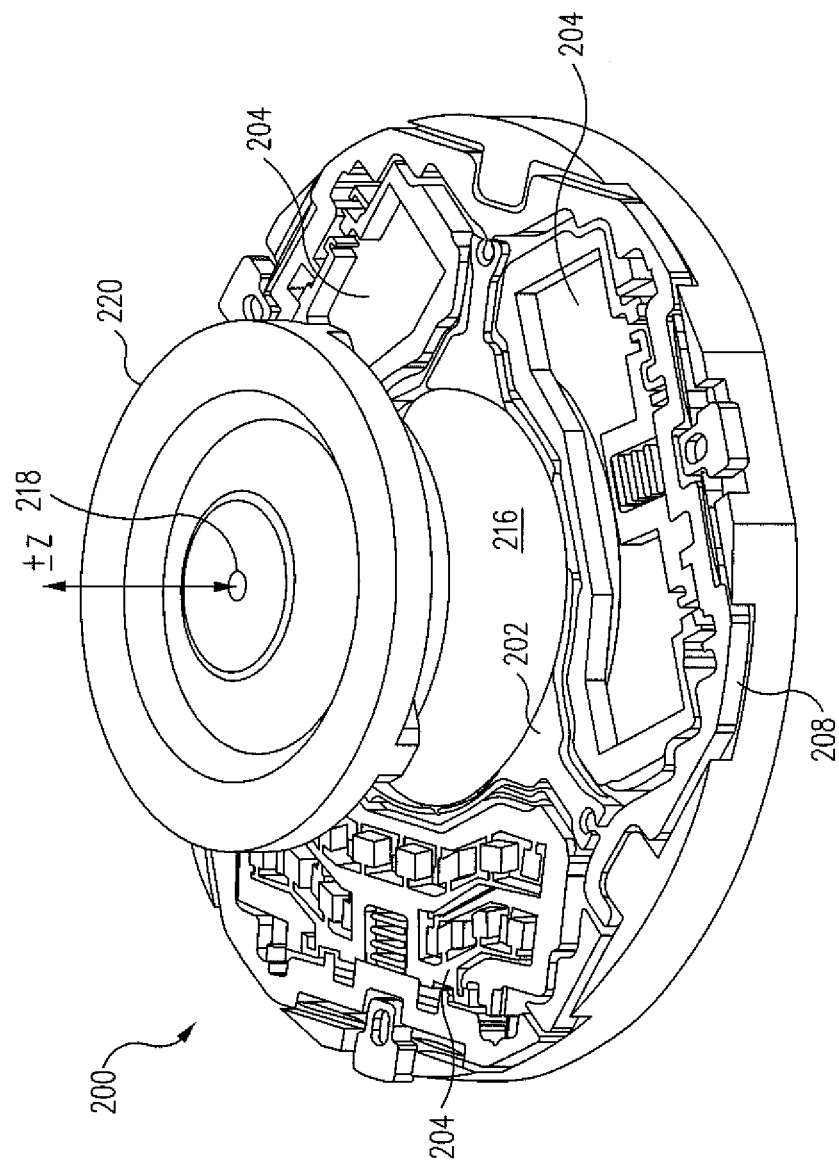
FIG. 4 is a perspective view of the actuator device of FIG. 3, showing a lens group mounted on a stage of the device for controllable movement along an optical axis of the lens group.

As illustrated in the figures, in some embodiments, the actuator device 100 can comprise a microelectromechanical systems (MEMS) device 100 that can be fabricated as a single integral structure from a substrate of, for example, silicon, using well-known micromachining and/or photolithography techniques, and as illustrated in FIGS. 3 and 4, the actuators 204 can comprise, for example, electrostatic "comb drive" actuators, each comprising a fixed frame 210, a moving frame 212 resiliently supported for rotational movement relative to the fixed frame 210, and a plurality of interdigitated teeth 214 alternately attached to the fixed and the moving frames 210 and 212.

Additionally, as illustrated in FIGS. 2-4, in some embodiments, the stage 202 can incorporate a central opening 216 having a center or centroid 218 and within which, for example, a lens or group of lenses 220 (see FIG. 4) or other optical element can be concentrically mounted. Alternatively, the central opening 216 in the stage 202 can be omitted, such that the stage 202 defines a moveable platform upon which, for example, an imaging sensor 108 of the type discussed above can be mounted.

As discussed in more detail in the above commonly owned applications, in some electrostatically actuated embodiments, the actuator 200 can be fabricated as a generally planar structure in which the application of a voltage differential to the interdigitated teeth 214 of the comb drive actuators 204 would not result in a desired out-of-plane movement of the stage 204 along the optical axis 110 of a camera 100. Accordingly, as illustrated in FIGS. 3 and 4, prior to operation of such actuator devices 100, the fixed frame 210 of each actuator 204 is "deployed" to offset with respect to one another the adjacent pairs of teeth 214 respectively attached to the fixed and moving frames 210 and 212. Such deployment results in a non-planar overall configuration of the actuator device 204. Methods and apparatus for rotationally deploying such an actuator device 200 for ±Z actuation are described in detail in commonly owned U.S. patent application Ser. No. 12/946, 646, filed Nov. 15, 2010, which is incorporated herein by reference.

As described therein, when thus deployed, each actuator 204 then includes a portion, viz., the fixed frame 210, that extends below the plane of the outer frame 208, as illustrated in FIGS. 3 and 4. Once deployed thus, the fixed frames 210 can then be respectively fixed or locked into position such that they do not move further with respect to the outer frame 208, and are angularly offset or "rotated" with respect to the associated moving frames 212. Actuation of the actuator 204, e.g., by application and/or removal of a voltage differential across the fixed and moving frames 210 and 212, will then cause the movable frames 212 to rotate down toward and/or up and away from the deployed fixed frames 210 to effect a desired rectilinear movement of the stage 202, and hence, any optical element mounted thereon, such as the moveable lens 104 of the camera 100 of FIG. 1, in the ±Z direction, i.e., along the optical axis 110 of the camera 100, so as to effect, for example, one or both of focusing and/or zooming of the camera 100.

Figure 5A:
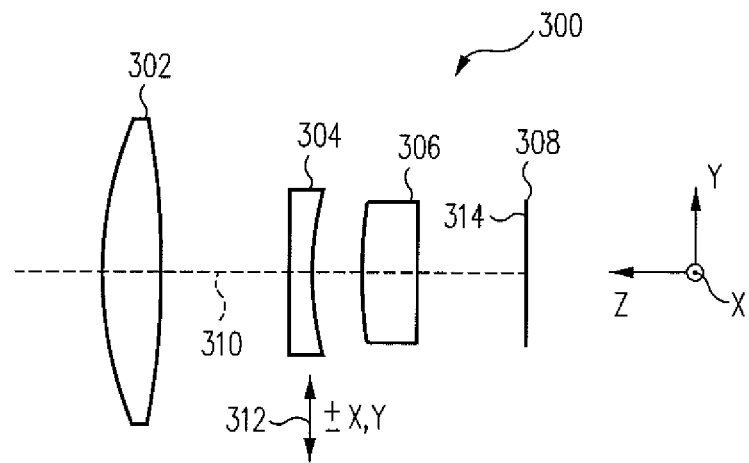
FIG. 5A is a schematic representation of another example digital camera, showing an intermediate lens movable in a plane orthogonal to an optical axis of the camera to effect optical image stabilization of the camera.
Figure 5B:
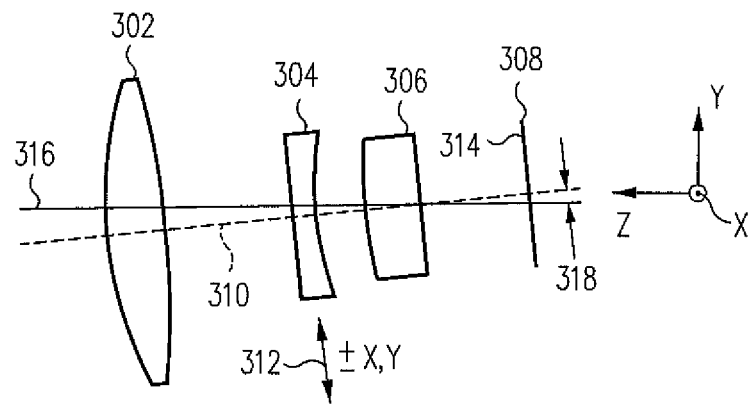
FIG. 5B is a schematic view of the camera of FIG. 5A, showing the blurring of an image formed on an imaging sensor of the camera as a result of a small downward acceleration, or shake, imposed on the camera during the taking of a hand-held exposure therewith.
Figure 5C:
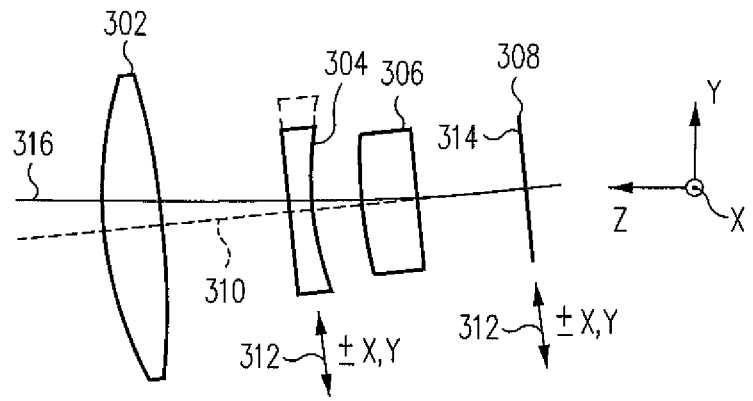
FIG. 5C is a schematic view of the camera of FIG. 5B, showing the moveable lens of the camera being moved in the focal plane of the camera to stabilize the image formed on the imaging sensor, thereby eliminating the blurring of the image caused by the shaking of the camera.

As those of some skill in this art will appreciate, while the example ±Z axis actuator 200 discussed above is capable of effecting such advanced camera features as focusing and zooming of the camera 100, a different type of actuator device is needed to effect optical image stabilization (OIS) of a camera that is subjected to small, random accelerations, such as typically experienced by shaking of a hand-held camera, as illustrated in FIGS. 5A-5C. In FIG. 5A, a digital camera 300, similar to the camera 100 of FIG. 1, comprises a front-end lens 302, an moveable intermediate lens 304, a back end lens 306, and a digital imaging sensor 108, all distributed coaxially with respect to each other along an optical axis 310 of the camera 300.

As illustrated in FIG. 5B, when the camera 300 experiences a downward acceleration, i.e., in the −Y direction, due to camera shake, the light rays 316 from a subject being photographed are bent downward relative to the optical axis 310, resulting in a blurring 318 of an image being formed on the image sensing surface 314 of the imaging sensor 308. If an exposure is made by the camera 300 during such an acceleration, the exposure produced of the image will likewise be blurred. A similar undesirable blurring can occur if the camera 300 is shaken from side to side, i.e., in the ±X direction.

However, as illustrated in FIG. 5C, if during the acceleration, the moveable lens 304 is simultaneously shifted downward by an amount corresponding to the downward displacement experienced by the camera 300, a light ray 316 from the subject will be refracted by the lens 304 back to its original point of incidence on the imaging sensor 308, and the image will thus remain sharp and in focus during an exposure. Alternatively, if the imaging sensor 308 is simultaneously shifted downward in by amount corresponding to the downward displacement experienced by the camera 300, the point of incidence of the light ray 316 on the imaging sensor 308 will similarly be restored to its original point of incidence thereon, and the image will thus remain sharp and in focus during an exposure. Thus, to effect OIS of the camera 300, an actuator device is needed that is capable of effecting a shift of an optical element, such as the moveable lens 304 or the imaging sensor 308 of the camera 300, in an X-Y plane orthogonal to the optical, or Z axis 310 of the camera 300, that is, in a "focal plane" of the camera 300.

Figure 6:
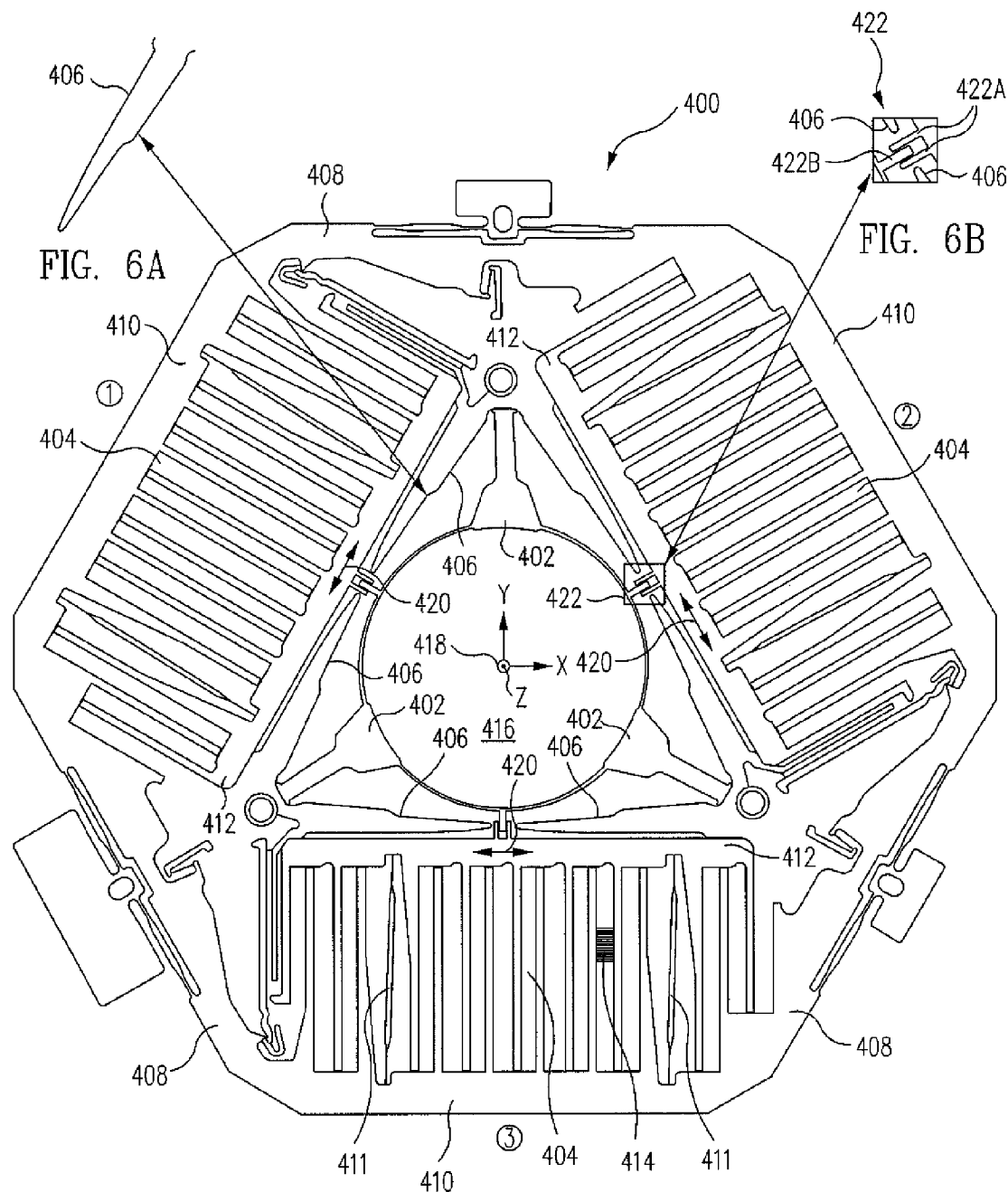
FIG. 6 is a plan view of an example actuator device in accordance with the present disclosure, useful in the example camera of FIG. 5A to effect movement of the moveable lens in the focal plane of the camera, and thereby, image stabilization thereof.

An actuator device 400 adapted to effect movement of an optical element, such as a lens, lens group or an imaging sensor, in an X-Y plane orthogonal to an optical or Z axis of a camera is illustrated in the plan view of FIG. 6. As illustrated in FIG. 6, in some embodiments, the actuator device 400 can include many features similar to those of the ±Z axis actuator device 200 of FIG. 2 described above. In particular, the actuator device 400 can comprise a stage 402 resiliently supported for movement within a plane, three or more actuators 404, each coupled to an outer periphery of the stage 402 through at least one flexure 404 and operable to apply a force acting in the plane and tangentially to the stage 402 when actuated, and an outer frame 408 surrounding and supporting the stage 402 and the actuators 404 during operation. In the particular example embodiment illustrated in the figures, the actuator device 400 incorporates three actuators 404, but in other embodiments, a greater number of actuators 204 can be used. Additionally, although the actuators 404 are shown arranged at equal angular intervals around the periphery of the stage 402, i.e., at 120 degree increments, other, even irregular, angular arrangements of the actuators 404 are possible.

As illustrated in FIG. 6, as in the ±Z axis actuator 200 described above, in some embodiments, the X-Y plane actuator device 400 can comprise a microelectromechanical systems (MEMS) device 400 that can be fabricated as a single integral structure from a substrate of, for example, silicon, using well-known micromachining and/or photolithography techniques, and the actuators 404 can comprise, for example, electrostatic comb drive actuators, each comprising a fixed frame 410, a moving frame 412 resiliently supported for rectilinear movement relative to the fixed frame 410 by one or more motion control flexures 411, and a plurality of interdigitated teeth 414 alternately attached to the fixed and the moving frames 410 and 412.

As further illustrated in FIG. 6, similar to the actuator device 200 above, in some embodiments, the stage 402 can incorporate a central opening 416 having a center or centroid 418, and within which, for example, a lens or group of lenses, such as the moveable lens 304 of the camera of FIG. 5A, or another type of optical element can be concentrically mounted. Alternatively, the central opening 416 in the stage 402 can be omitted, such that the stage 402 defines a moveable platform upon which, for example, an imaging sensor 308 of the type discussed above in connection with FIG. 5A can be mounted.

The principal differences between the example ±Z axis actuator 200 of FIG. 2 described above and the example X-Y plane actuator device 400 of FIG. 6 relate to the manner in which the respective moving frames 412 of the actuators 404 are coupled to the stage 402, the direction of movement of the actuators 404 during actuation, and the resulting motion of the stage 402 in response to selected individual actuation of the actuators 404. More particularly, as can be seen in FIG. 6, the moving frame 412 of each actuator 404 is coupled to the stage 202 by a bilaterally symmetrical pair of "leaf springs," or recurvate flexures 406, one of which is shown enlarged in the detail view FIG. 6A. The flexures 406 are relatively stiff in the Z direction, i.e., perpendicular to the plane of the device 400, but resiliently flexible in the X, Y directions, i.e., they couple tangential motion of the associated actuator 404 to the stage 402 in a relatively stiff manner, while at the same time, are very compliant in the radial direction, thereby forming a "pseudo-kinematic" outer arrangement.

Figure 6C:
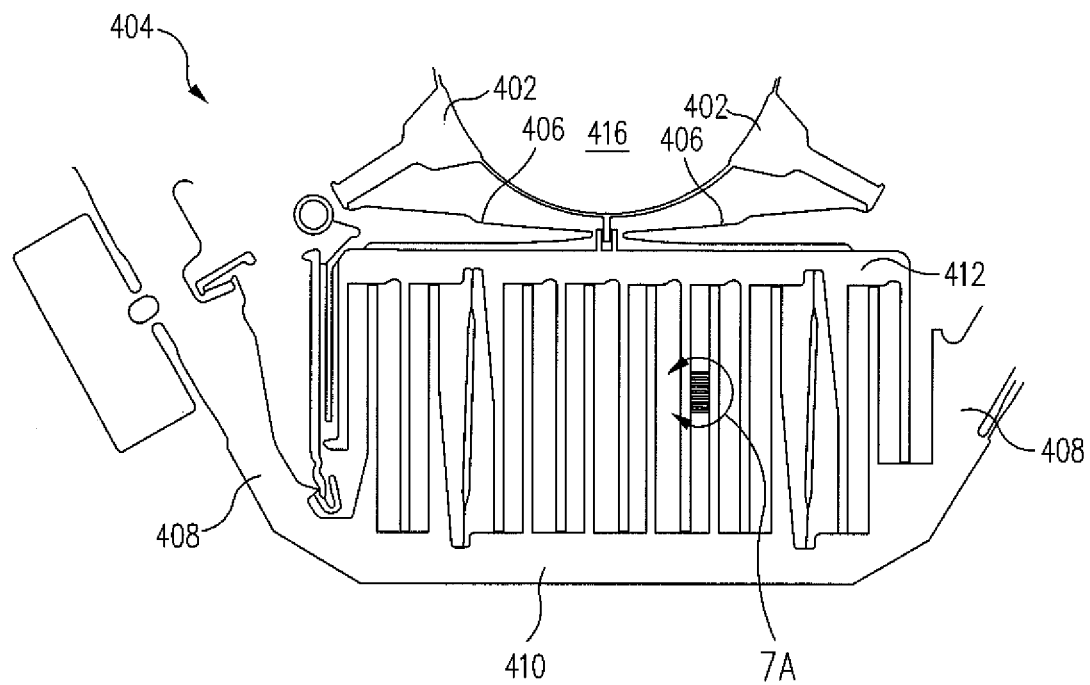
FIG. 6C is a partial plan view of an actuator of the example actuator device of FIG. 6, showing the actuator in an as-fabricated state and before being deployed for operational use.

Additionally, as may be seen in the enlarged detail view of FIG. 6C, the interdigitated teeth 414 of the comb drive actuators 404, which are alternately coupled to the respective fixed and moving frames 410 and 412 of the actuators 404, are oriented for reciprocal movement toward and away from each other in a tangential direction relative to the stage 402, as indicated by the double-headed arrows 420 in FIG. 6 in response to the application of a voltage differential to, or its removal from, the fixed and moving frames 410, 412 and their associated fixed and moving teeth 414A and 414B. This is different from the generally radial orientation of the teeth 214 of the ±Z axis actuator 200 of FIGS. 2-4. As described in more detail below in connection with FIGS. 8A-8F, this arrangement results in an actuator device 400 in which, by appropriate individual actuation of each of the actuators 404, the stage 402, and hence, an optical element coupled to the stage 402 for conjoint movement therewith, such as a lens, can be made to move in a plane, e.g., an X-Y or focal plane of a camera, with pure translational and/or pure rotational movement, that is, with ±X, ±Y and/or ±$\theta_z$ movement in that plane.

Also illustrated in the enlarged detail view of FIG. 6B is an example "limit stop" 422, comprising a bifurcated fork 422A disposed on the moving frame 412 of the associated actuator 404 and a pin 422B extending into the bifurcation of the fork 422A with a relatively loose fit. As those of skill in the art will understand, when the actuators 404 of the actuator device 400 are powered on and being used to drive the stage 402, the loose fit between the fork 422A and pin 422B ensures that the tangential driving force applied to the stage 402 by the associated actuator 404 is coupled to the stage 402 exclusively through the recurvate flexures 406. However, when the actuators 404 are powered off, the limit stops 422 can serve to prevent large relative motion between the actuators 404 and the stage 402 that might be experienced by the device 400 during a shock event, and thereby prevent damage to the device 400 that might otherwise result therefrom.

Figure 7A:
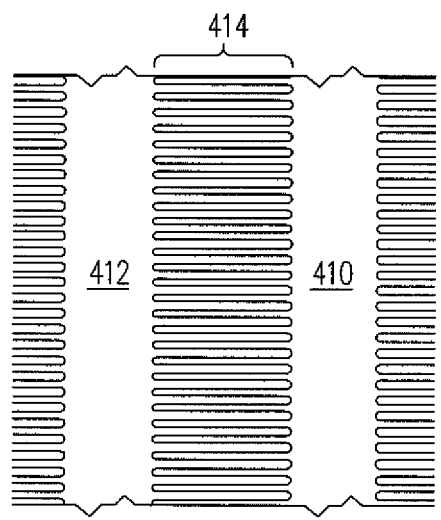
FIG. 7A is an enlarged detail view of the fixed and moving teeth of the actuator of FIG. 6C, showing the teeth before the actuator is deployed for operational use.

In some embodiments, in order to minimize the size of the actuators 404 while at the same time maximizing the length of travel of the fixed and moving teeth 414A and 414B relative to each other, the actuator device 400 can be fabricated such that, in the as-fabricated state, the interdigitated fixed and moving teeth 414A and 414B of the actuators 404 are disposed immediately adjacent to each other, i.e., with little or no spacing between the respective ends of the teeth 114 and the opposing fixed or moving frame 410, 412, as illustrated in the enlarged detail view of FIG. 7A. As those of some skill in this art will appreciate, in this condition, the application of a voltage differential to the interdigitated teeth 414 of the actuators 404 would not result in any useful movement of the moving frame 412 relative to the fixed frame 410.

Figure 6D:
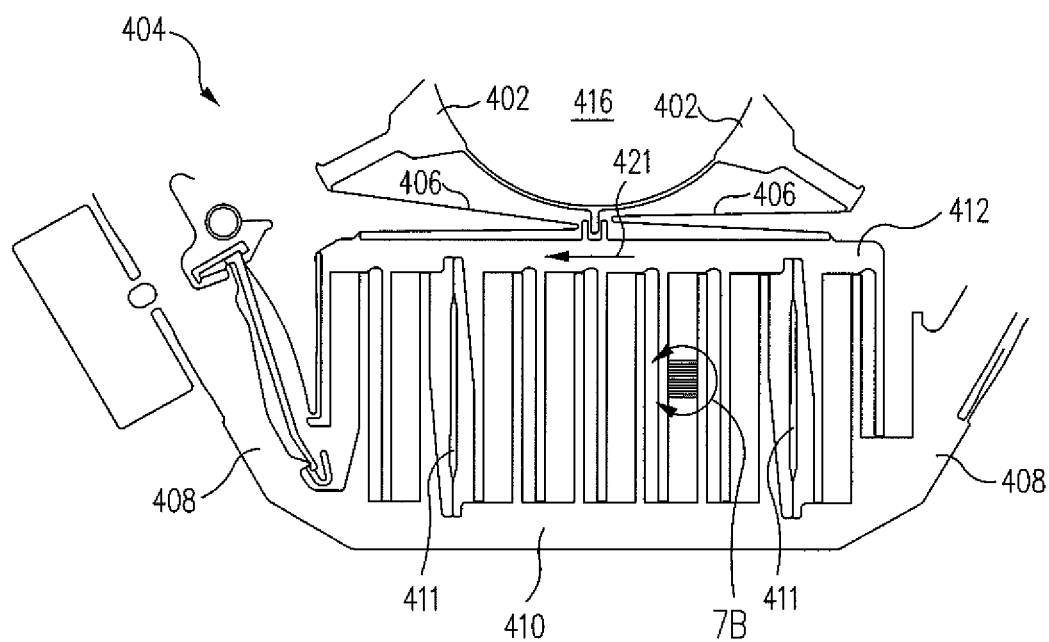
FIG. 6D is a partial plan view of the actuator of FIG. 1C, showing the actuator after deployment thereof.
Figure 7B:
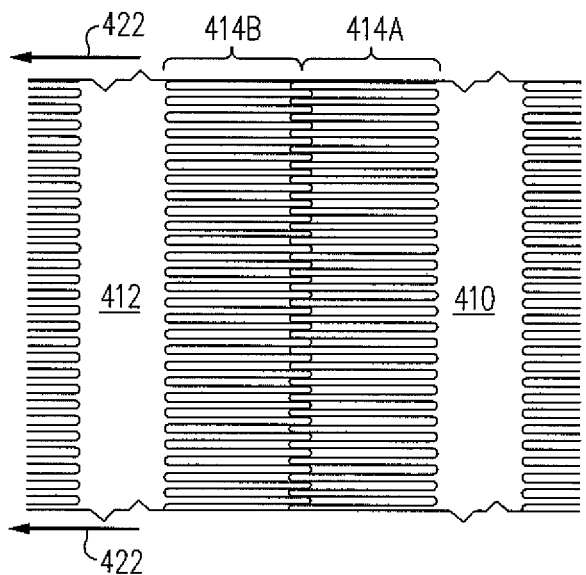
FIG. 7B is an detail view of the fixed and moving teeth of the actuator of FIG. 6D, showing the teeth after the actuator has been deployed.

Accordingly, as illustrated in FIGS. 6D and 7B, prior to operation of such actuator devices 400, the moving frame 412 of each actuator 404 can be "deployed" laterally with respect to the fixed frame 410, as indicated by the arrows 422 in FIG. 7B, to a position that is coplanar with, parallel to, and spaced at a selected distance apart from the associated fixed frame 410 for substantially coplanar, rectilinear, reciprocal movement relative to the associated fixed frame 410, and then fixed or latched in that deployed position. As described in more detail in commonly owned U.S. patent application Ser. Nos. 12/946,670 and 12/946,657, both filed Nov. 15, 2010 the disclosure of which are all incorporated herein by reference, there are several different methods and apparatus for moving the moving frame 412, and hence, the associated moving portion of the teeth 414B, of an actuator 404 to the deployed position, as well as for latching or fixing it in the deployed position. Thus, FIGS. 6C and 7A respectively illustrate an example actuator 404 and the associated teeth 414 thereof in the un-deployed state, and FIGS. 6D and 7B respectively illustrate the actuator 404 and its teeth 414 disposed in the deployed state.

Figure 7C:
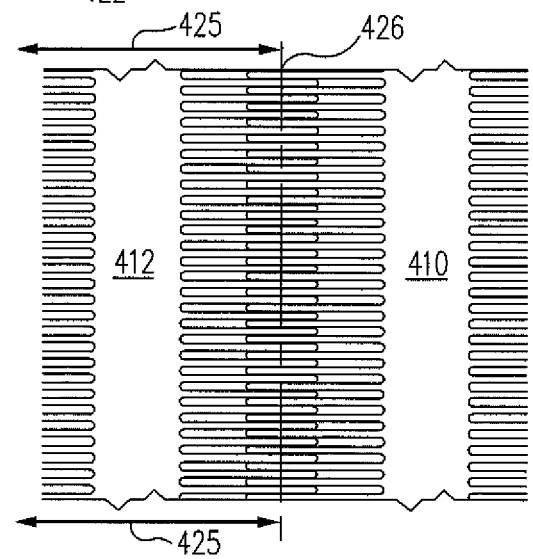
FIG. 7C is a partial plan view of the fixed and moving teeth of the deployed actuator of FIG. 6D, after a moving frame and a moving portion of the teeth have been biased to an operating position.

As illustrated in FIGS. 6D and 7B, in some embodiments, when the actuators 404 have been deployed but no actuation voltages are being applied to them, the deployed position of the moving frames 412 relative to the fixed frames 410 can define a "beginning-of travel," "power-off" or "parked" state of the actuators 404, in which the centroid 418 of the stage 402 remains centered within the actuator device 400. As illustrated in FIG. 7C, by the application of a suitable voltage differential to the fixed and moving teeth 414A and 414B, the actuators 404 can then all be biased to a "half-travel" or "operating" position, as indicated by the phantom line 426 in FIG. 7C. Thereafter, an increase in the bias voltage on a given actuator 404 will result in a tangential movement of its associated moving frame 412 away from the biased position 426 and toward the associated fixed frame 410 thereof, and conversely, a decrease in the bias voltage will result in a tangential movement of its moving frame 412 away from the biased position 426 and the fixed frame 410, as indicated by the double-headed arrows 425 in FIG. 7C. As will be appreciated, removal of all voltages from the actuator 404 will result in the moving frame 412 returning to its original, beginning-of-travel or power-off or parked position, as illustrated in FIG. 7B.

As illustrated in the vector diagrams of FIGS. 8A-8F, the stage 402 of the actuator device 400 is represented by the centroid 418 of the stage 402 (or an opening 416 therein), the actuators 404 are respectively designated, clockwise, as "①," "②" and "③," and the purely tangential forces exerted on the stage 204, and hence, on the centroid 418, by the actuators 404 coupled thereto through the flexures 206 are represented by the bold directional arrows. Additionally, the direction of the arrows is arbitrarily defined as negative if they have a tendency to turn the centroid 418 in the clockwise direction, and positive if they would tend to turn the centroid 418 in the counterclockwise direction. The dashed lines R respectively represent radial distances from the centroid 418 to the "virtual" point of contact between the stage 402 and the associated actuator 404, as defined by the associated pair of flexures 406. In the figures, it can be seen that the application of the tangentially acting forces by the actuators ①, ② and ③ to the centroid 418 through the respective "moment arms" R will result in respective turning moments being applied to the centroid 418, each of which can be resolved into a force and a pure couple acting directly thereon.

Figure 8A:
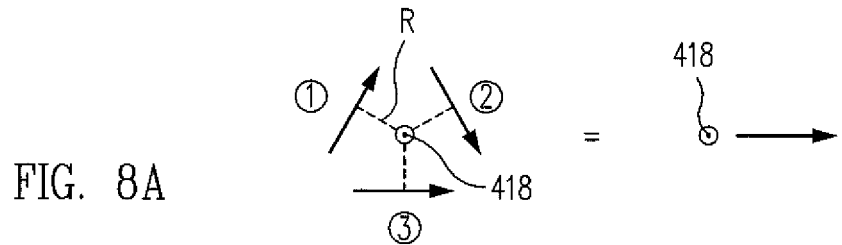
FIGS. 8A-8F are vector diagrams illustrating the use of the example actuator device of FIG. 6 to effect in-plane translational and rotational movement of a stage of the actuator.

Referring then to FIG. 8A, it can be seen that if actuators ① and ② are biased in the negative or clockwise direction, and actuator ③ is biased in the positive or clockwise direction, the vertical components of the force vectors of the actuators ① and ② will cancel each other out, and the remaining horizontal components will combine with each other and the force vector of actuator ③ to drive the centroid 418 of the stage 402 from an initial bias point to a final bias point with purely translational motion in the +X direction. Similarly, as illustrated in FIG. 8C, if the foregoing respective actuator biasing directions are reversed, the centroid 418 will be driven with pure translational motion in the −X direction.

Figure 8B:
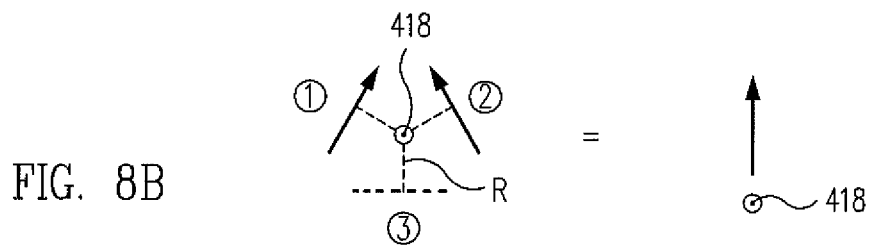
Figure 8C:
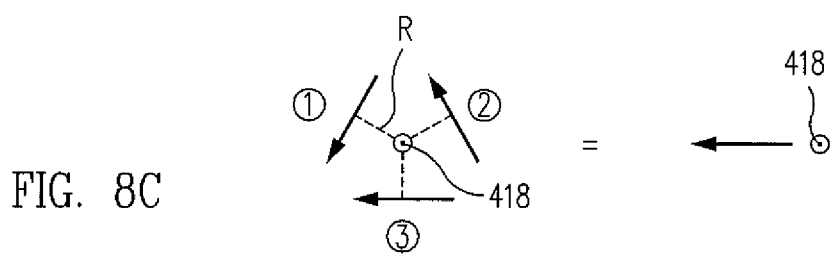
Figure 8D:
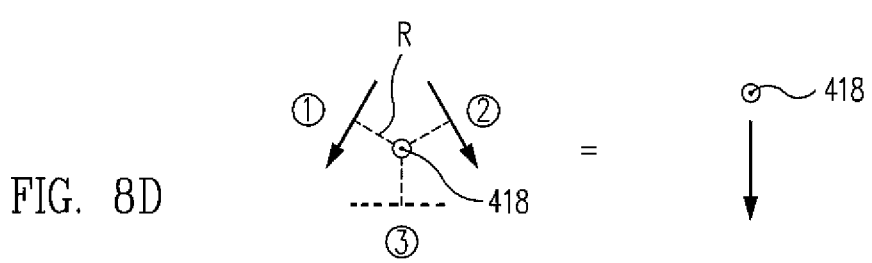

Referring next to FIG. 8B, it can be seen that if actuators ① and ② are respectively biased in the negative and positive directions, and actuator ③ remains unbiased (as indicated by the dashed line), the horizontal components of the force vectors of actuators ①and ②will cancel each other out, and the remaining vertical components will combine with each other to drive the centroid 418 of the stage 402 with purely translational motion in the +Y direction. Similarly, as illustrated in FIG. 8D, if the foregoing respective actuator biasing directions are reversed, the centroid 418 will be driven with pure translational motion in the −Y direction.

Figure 8E:
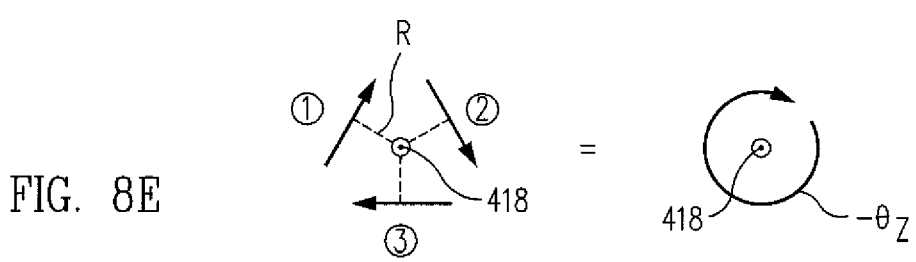
Figure 8F:
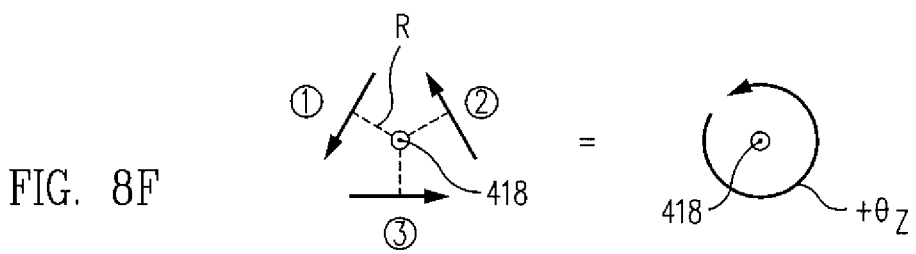

Referring next to FIGS. 8E and 8F, it can be seen that, by biasing each of the actuators ①, ② and ③ in the same direction, i.e., in either the positive or the negative direction, a pure couple will be applied to the centroid 418, such that the stage 402 will rotate in the plane of the stage 402 with purely rotational movement about the centroid 418, i.e., in the $\theta_z$ or $+\theta_z$ directions, respectively.

Thus, it may be seen that, by suitable biasing of the individual actuators ①, ② and ③, the stage 402 and its centroid 418 can be driven with pure rectilinear movement to any linear combination of the foregoing ±X and ±Y displacements, as well as rotated in the θ direction. Trigonometrically, the respective tangential travel distances $L_1$, $L_2$ and $L_3$ of the actuators ①, ② and ③ required to effect these rectilinear displacements are given by, $$L_1 = R\mathrm{Sin}\theta - \frac{1}{2}X + \frac{\sqrt{3}}{2}Y$$
$$L_2 = R\mathrm{Sin}\theta - \frac{1}{2}X + \frac{\sqrt{3}}{2}Y$$
$$L_3 = R\mathrm{Sin}\theta + X, \text{ where}$$

$L_1$, $L_2$ and $L_3$ are the respective distances that the actuators ①, ② and ③ need to travel in the tangential direction to effect the desired linear displacements X and Y, R is the radial distance from the centroid 418 to the virtual point of contact between the stage 402 and an associated one of the actuators 404, and θ is the angular rotation of the stage 402 in the plane of the device.

As discussed above and illustrated in FIG. 9A, in some embodiments, when no actuation voltages are being applied to the actuators ①, ② or ③, the deployed position of the moving frames 212 relative to the fixed frames 210 can define a "beginning-of travel," "power-off" or "parked" state of the actuators, in which the centroid 418 of the stage 402 is centered within the actuator device 400, as indicated by the solid lines R in FIG. 8A. As illustrated in FIG. 8A, the actuators ①, ② and ③ can then all be rotationally biased (e.g., in the $+\theta_z$ direction illustrated) to a "half-travel" or "operating" state for operation by the application of a suitable voltage differential to each of the actuators ①, ② and ③, as discussed above and illustrated by the dashed lines in FIG. 9A.

As illustrated in FIG. 9B, when the actuator device 400 has been biased to its "operating" state, selectively applying controlled increases or decreases in the respective biasing voltages on each of the actuators ①, ② and ③ will result in the deterministic movement of the stage 402 of the actuator 400 illustrated and discussed above in connection with FIGS. 8A-8F. As discussed above in connection with FIGS. 5A-5C, this ability to precisely control rectilinear in-plane movement of the stage 402, together with an optical element suitably coupled to it, can be used advantageously for a variety of applications, including OIS, e.g., in a camera.

For example, as illustrated in FIGS. 5A-5C, a camera 300 can incorporate a moveable lens 304 or imaging sensor 308 disposed on the stage 402 of an actuator device 400 for conjoint in-plane movement by the device. A suitable OIS controller for the actuator device 400 can include, for example, a sensing apparatus, such as accelerometers, for sensing vertical and/or horizontal accelerations of the camera and for generating output signals corresponding thereto, and a controlling apparatus that selectably controls the actuators 404 of the actuator device 400 using the signals output from the sensing apparatus such that an image formed on the sensor remains stable during the accelerations of the camera, e.g., the shaking of a hand-held camera, as discussed above.

As those of some skill in this art will appreciate, the ability to rotate the stage 402 about the centroid 418 of the stage 402 or an optical axis of a camera can have additional advantageous applications. For example, whereas, rotating a lens about its centroid or the optical axis of a lens assembly or camera generally has no advantageous optical effect, rotating some types of optical elements, such as polarizers, diffraction gratings and dichromatic elements, and some types of sensors about this feature axis can, in some instances, provide a desired effect. Further, it can be seen that an actuator 400 capable of such movement is also capable of rotating various mechanical elements (such as shutters) to effect their actuation.

Figure 10A:
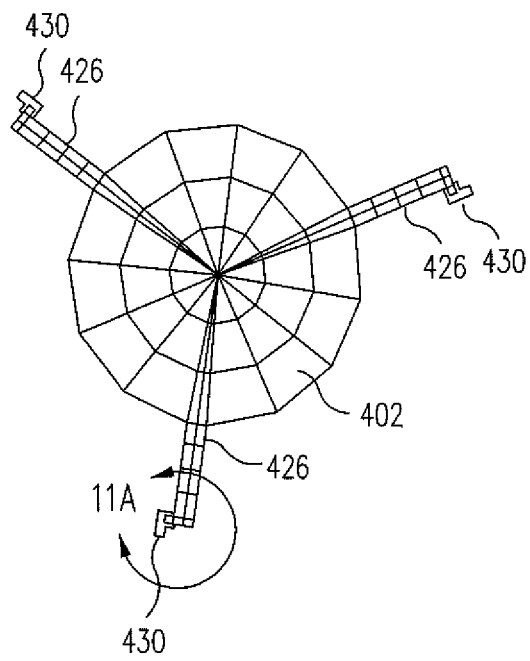
FIGS. 10A and 10B are schematic plan views of a moving stage of the actuator device of FIG. 6, respectively showing the stage disposed in the parked and operating states.
Figure 10B:
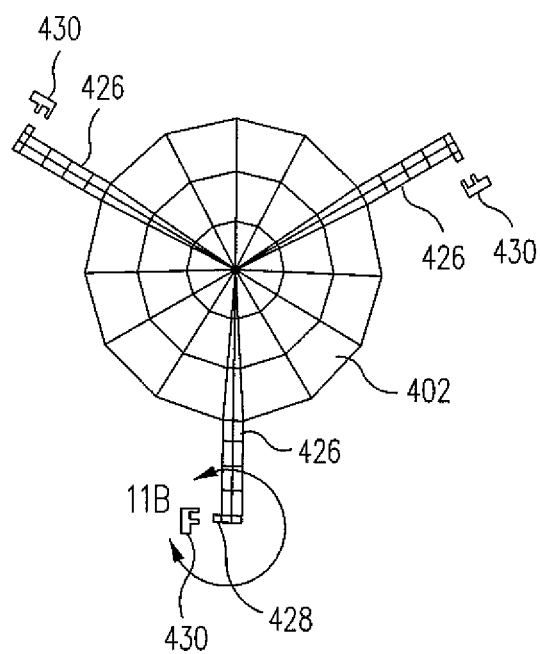
Figure 11A:
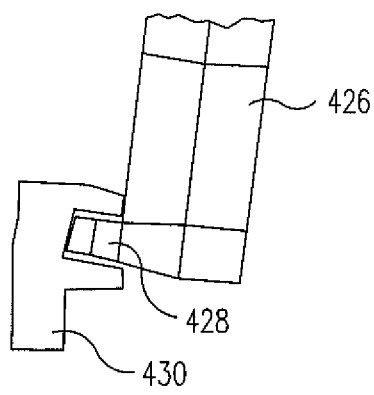
FIGS. 11A and 11B are enlarged detail views schematically illustrating a locking arm coupled to the stage of the actuator device and an associated locking feature coupled to an outer frame of the device that is operable to engage a complementary locking feature on the locking arm when the stage is rotationally disposed in the parked state and to disengage therefrom when the stage is disposed in the operating state.
Figure 11B:
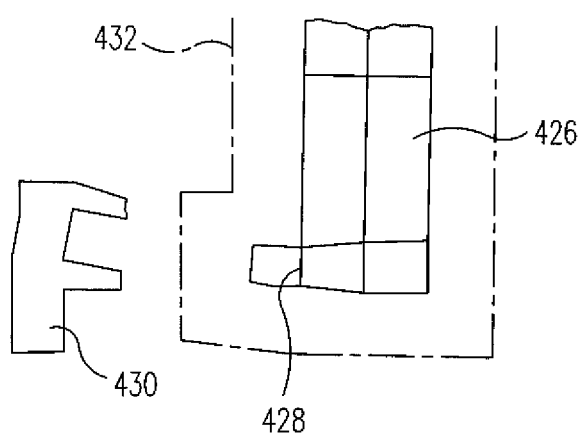

Additionally, as illustrated in FIG. 9C, when the actuators ①, ② and ③ of the device 400 are powered down from the biased operating state described above, the stage 402 will rotate about its centroid 418 back to its initial "parked" or "power-off" state, as illustrated in FIG. 9A. As illustrated in FIGS. 10A-11B, this power-off state of the actuator device can be utilized advantageously to "park" the actuator device 400 in a configuration in which the stage 402 is locked against shock forces and in-plane sagging effects acting on the stage 402 and flexures 406 during periods of device inactivity. Thus, in some embodiments, one or more locking arms 426, each having a locking feature 428 disposed thereon, can be coupled to the periphery of stage 402, and a corresponding plurality of complementary locking features 430 can be coupled, e.g., to the outer frame 408, and arranged to engage a corresponding one of the complementary locking features 428 on the locking arms 426 when the stage 402 is rotationally disposed in the parked, or power-off state, as illustrated in FIGS. 10A and 11A. In FIG. 11B, the phantom outline 432 delineates the range of motion of the periphery of an end portion of a locking arm 426 and locking feature 428 in the operating state and during an image stabilization operation of the actuator device 400, and illustrates that no interference will occur between the arm 426, locking feature 428 and the complementary locking feature 430 during such operation.

As those of some skill in this art will by now appreciate, and depending on the particular application at hand, many modifications, substitutions and variations can be made in and to the materials, apparatus, configurations and methods of use of the actuator devices of the present disclosure without departing from the spirit and scope thereof, and in light this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An actuator device, comprising:
 a stage resiliently supported for movement within a plane, wherein the stage comprises a planar mounting structure disposed in the plane that is adapted to support an optical element;

three or more actuators, each coupled to an outer periphery of the stage and operable to apply a linear force along a straight line acting in the plane and tangentially to the stage when actuated;

a flexure interposed between each actuator and the outer periphery of the stage;

wherein at least two of the flexures are coupled to a common location on the outer periphery;

wherein the linear forces, when applied to the flexures, are configured to cooperate to effect the movement of the stage in any translational and/or any rotational direction within the plane; and an outer frame surrounding and supporting the stage and the actuators.

2. The actuator device of claim 1, wherein the stage, the actuators and the outer frame are disposed generally coplanar with each other.

3. The actuator device of claim 1, wherein at least one of the flexures is a recurvate flexure, and wherein each flexure is coupled to an extended portion of the stage that extends along a line passing between two of the actuators.

4. The actuator device of claim 1, wherein at least one of the actuators comprises:

a fixed frame, a moving frame resiliently supported for reciprocating movement relative to the fixed frame, and a plurality of straight interdigitated teeth alternately attached to the fixed and the moving frames and oriented for reciprocal movement toward and away from each other in a tangential direction relative to the stage.

5. The actuator device of claim 4, wherein the moving frame is supported for movement relative to the fixed frame by at least one flexure.

6. The actuator device of claim 1, wherein at least one of the actuators comprises an electrostatic actuator.

7. The actuator device of claim 1, wherein the actuators are arranged at equal angular intervals around the outer periphery of the stage.

8. The actuator device of claim 1, further comprising a limit stop disposed between at least one of the actuators and the stage for limiting relative movement between the at least one actuator and the stage during a shock event.

9. The actuator device of claim 1, further comprising at least one locking arm coupled to the stage and at least one associated locking feature coupled to the outer frame and operable to engage a complementary locking feature on the locking arm when the stage is rotationally disposed in a parked state.

10. The actuator device of claim 1, wherein the stage, the actuators and the outer frame are formed integrally with each other from a substrate using at least one of micromachining and/or photolithography techniques.

11. A method for operating the actuator device of claim 1, the method comprising selectably actuating each of the actuators such that the stage moves in the plane with at least one of pure translational and/or pure rotational movement.

12. The method of claim 11, further comprising selectably actuating each of the actuators such that the stage moves with purely rotational movement from a parked state to an operating state or from an operating state to a parked state.

13. A camera, comprising:

a sensor having an image sensing surface;

an actuator device, including:

a stage resiliently supported for movement within a plane, wherein the stage comprises a planar mounting structure disposed in the plane;

three or more actuators, each coupled to an outer periphery of the stage and operable to apply a linear force along a straight line acting in the plane and tangentially to the stage when actuated;

a flexure interposed between each actuator and the outer periphery of the stage;

wherein at least two of the flexures are coupled to a common location on the outer periphery;

wherein the linear forces, when applied, are configured to cooperate to effect the movement of the stage in any translational and/or any rotational direction within the plane; and an outer frame surrounding and supporting the stage and the actuators; and an optical element disposed on the stage of the actuator device to move conjointly therewith and operable to focus an image of a subject on the image sensing surface of the sensor.

14. The camera of claim 13, further comprising:

a sensing apparatus for sensing at least one of vertical and/or horizontal accelerations of the camera and for outputting signals respectively corresponding thereto; and, a controlling apparatus for selectably controlling the actuators of the actuator device using the signals output from the sensing apparatus such that the image of the subject formed by the optical element on the sensing surface of the sensor remains stable during the accelerations of the camera.

15. A cellular telephone, a personal digital assistant (PDA), a laptop computer or a surveillance system incorporating the camera of claim 14.

16. A camera, comprising:

an actuator device, including:

a stage resiliently supported for movement within a plane, wherein the stage comprises a planar mounting structure disposed in the plane;

three or more actuators, each coupled to an outer periphery of the stage and operable to apply a linear force along a straight line acting in the plane and tangentially to the stage when actuated;

a flexure interposed between each actuator and the outer periphery of the stage;

wherein at least two of the flexures are coupled to a common location on the outer periphery;

wherein the linear forces, when applied, are configured to cooperate to effect the movement of the stage in any translational and/or any rotational direction within the plane; and, an outer frame surrounding and supporting the stage and the actuators;

a sensor disposed on the stage of the actuator device to move conjointly therewith and operable to sense an image of a subject focused on an image sensing surface thereof; and an optical element disposed in front of the stage of the actuator device and operable to focus an image of a subject on the image sensing surface of the sensor.

17. The camera of claim 16, further comprising:

a sensing apparatus for sensing at least one of vertical and/or horizontal accelerations of the camera and for outputting signals respectively corresponding thereto; and, a controlling apparatus for selectably controlling the actuators of the actuator device using the signals output from the sensing apparatus such that the image of the subject formed by the optical element on the sensing surface of the sensor remains stable during the accelerations of the camera.

18. A cellular telephone, a personal digital assistant (PDA), a laptop computer or a surveillance system incorporating the camera of claim 17.

19. A method, comprising:
providing a stage resiliently supported for movement within a plane, wherein the stage comprises a planar mounting structure disposed in the plane;
coupling three or more actuators to an outer periphery of the stage, each of the actuators being operable to apply a linear force along a straight line acting within the plane and tangentially to the stage when actuated;
wherein the coupling comprises coupling each actuator to the outer periphery of the stage using a flexure interposed between each actuator and the outer periphery of the stage;
wherein at least two of the flexures are coupled to a common location on the outer periphery;
wherein the linear forces, when applied, are configured to cooperate to effect the movement of the stage in any translational and/or any rotational direction within the plane; and,
selectably actuating each of the actuators such that the stage moves in the plane with at least one of pure translational and/or pure rotational movement therein.

20. The method of claim 19, further comprising:
sensing accelerations acting on the stage and the actuators;
outputting signals respectively corresponding to the accelerations; and,
selectably controlling the actuators using the signals to stabilize an image of a subject formed by an optical element on a sensing surface of a sensor during the accelerations.

* * * * *